J. S. BRADLEY.
COMPUTING SCALE.
APPLICATION FILED JULY 25, 1908.
909,745.
Patented Jan. 12, 1909.
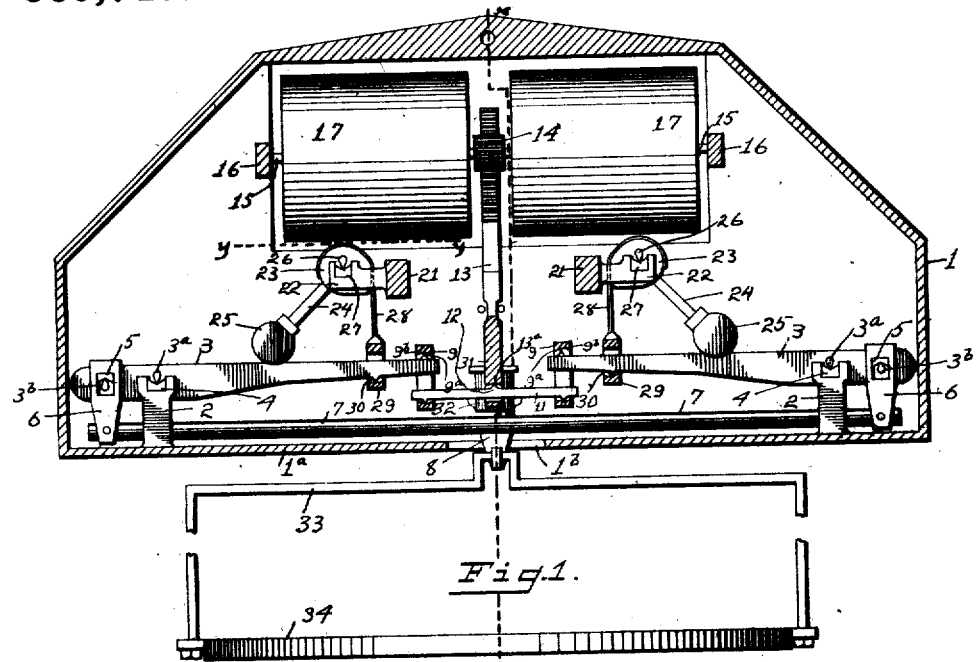
Fig. 1.
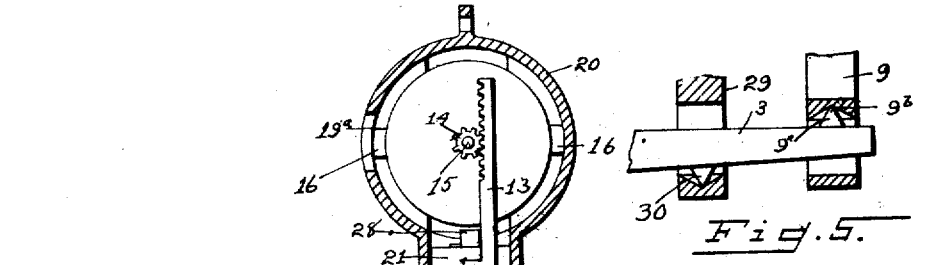
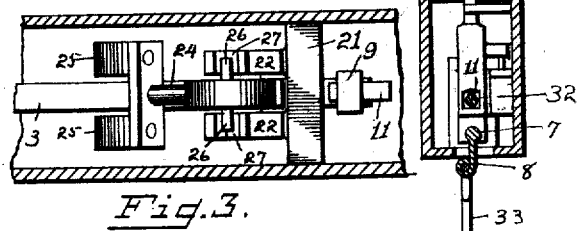
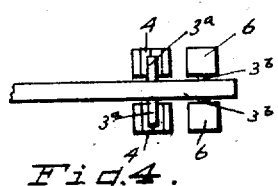
Fig. 3.   Fig. 2.   Fig. 4.
Witnesses
Carl Stoughton
A. L. Phelps
Inventor
John Sturgus Bradley
By
C. C. Shepherd
Attorney

UNITED STATES PATENT OFFICE.

JOHN STURGUS BRADLEY, OF NEW CONCORD, OHIO.

COMPUTING-SCALE.

No. 909,745.　　　Specification of Letters Patent.　　　Patented Jan. 12, 1909.

Application filed July 25, 1908. Serial No. 445,339.

*To all whom it may concern:*

Be it known that I, JOHN STURGUS BRADLEY, a citizen of the United States, residing at New Concord, in the county of Muskingum and State of Ohio, have invented certain new and useful Improvements in Computing-Scales, of which the following is a specification.

My invention relates to computing scales of that class known as suspension scales, in which the frame of the weighing and indicating mechanism is suspended and in which the weighing tray depends or is suspended therefrom.

The objects of my invention are to provide an improved construction of weighing mechanism of this class, comprising means for producing an accurate and reliable acting of the chart operating means regardless of the position of the weight on the tray; and to produce other improvements in details of construction, which will be more fully pointed out hereinafter. These objects I accomplish in the manner illustrated in the accompanying drawing, in which:

Figure 1 is a central vertical section of a scale frame showing my weighing mechanism partly in section and partly in elevation therein, Fig. 2 is a central vertical section of the platform, Fig. 3 is an enlarged detail sectional view on line y—y of Fig. 1, Fig. 4 is a plan view of the outer end portion of one of the scale beams and its bearings, and, Fig. 5 is an enlarged detail view illustrating the bearings of the inner end portion of one of the scale beams.

Similar numerals refer to similar parts throughout the several views.

1 represents a suitable exterior frame or casing having a horizontal bottom portion 1ª and having its upper end portion adapted to be engaged by a suitable suspension hook. Rising from the bottom plate 1ª of the casing near each side thereof is a vertical standard 2 and in each of these standards is fulcrumed the outer portion of an inwardly extending scale beam 3, said beams being provided with knife edge bearing projections 3ª which bear in V-shaped agate bearings 4 supported by said standards. The outer end of each of the beams 3 is also provided with oppositely located knife edge bearing projections which are indicated at 3ᵇ, the upper edges of the latter engaging the undersides of the V-shaped agate bearings 5 which are carried in slotted openings formed in the upper portion of a hanger 6. The lower ends of these hangers are pivotally connected respectively with a horizontal bar 7, which at the center of its length is provided with a depending hook 8 which projects through an opening 1ᵇ in the bottom plate 1ª of the casing 1.

The inner end of each of the beams 3 extends through a slotted opening in the upper portion of a vertical hanger 9, said beam being provided with a knife edge bearing projection 9ª on its upper side, which bears in a V-shaped agate bearing 9ᵇ in the upper side of the slotted opening in said hanger. Extending through the lower portions of the hangers 9 and having lower side knife edge bearing projections which engage the lower end portions of the slots in said hangers is an equalizing bar 11. At the center of its length, the bar 11 is formed with a knife edge projection 12 on its upper side, which bears in the upper end of a slotted opening 13ª formed in the lower end of an upwardly extending chart operating rack bar 13, the upper and toothed portion of which engages the teeth of a pinion 14 which is carried on the usual chart cylinder operating shaft 15. The shaft 15 is suitably mounted in transverse frame elements 16 and carries one or more indicating or chart cylinders 17, the indications on which are adapted to be read through a suitable opening 19ª on a cylinder casing 20.

Below the chart cylinder and on opposite sides of the bar 13, I provide horizontal frame bars 21 from each of which projects outwardly a bracket arm 22, the latter being bifurcated to receive the disk-like head 23 of a pendulum which comprises a rod 24 connected with said head and a weight 25 on the end of said rod. The pendulum head is provided on opposite faces with knife blade bearing projections 26 which bear in the V-shaped upper sides of agate bearings 27 carried by the bracket arm 22. The periphery of the pendulum head has connected therewith one end of a flexible strap 28, the lower end of which is connected with the upper end of a hanger 29 through a slotted opening in which passes the corresponding beam 3, the lower side of each of said beams having formed therewith a knife blade projection 30 which bears in the lower portion of said hanger.

The lower end of the bar 13 is connected with the upper end of a piston rod 31, the lower end of which connects with a piston contained in a dash pot 32 suitably mounted below said bar 13.

As shown, the depending bar hook 8 is adapted to have suspended therefrom the central portion of a bail 33 which carries a suitable weighing tray 34.

As shown by the drawing, the pendulum rods and weights are normally inclined outwardly from the bracket arms 22, the weights 25 being thereby held in an elevated position. In this connection it will be observed by reference to Fig. 3 of the drawing, that each of the weight bodies is bifurcated so as to permit of its swinging downward without interference with the beam 3 which is beneath.

Assuming that a body to be weighed is placed upon the tray 34, it will be understood that a downward movement will be imparted to the horizontal bar 7, hangers 6 and outer ends of the beams 3, which movement will be in proportion to the weight carried by the tray. The resultant upward movement of the inner end portions of the beams 3, will cause an equal upward movement to be imparted to both ends of the equalizing bar 11 and a consequent upward movement will be imparted to the rack bar 13, which through its engagement with the pinion 14 will serve to turn the chart cylinder in the usual manner to the desired position. By the upward movement of the inner end portions of the beams, it is obvious that the weighted pendulums will be permitted to swing downward toward a vertical position the extent of movement thereof being governed by the weight on the tray.

Owing to the employment and connection of the opposing beams 3 and the connection therewith of opposite ends of the equalizing bar 11 and the fact that the tray is centrally suspended from the connecting bar of the beams, it will be understood that the operating movement of the bar 13 will be the same regardless of the position of the body to be weighed on the tray, and regardless of the position in which the scales are suspended.

What I claim, is:

1. In a weighing mechanism, the combination with a suspended frame, opposing scale beams fulcrumed in said frame, and a tray carrying bar suspended from said beams on the outer sides of their fulcrum points, of an equalizing bar, connections between the ends of the latter and said beams, and a chart operating bar centrally connected with said equalizing bar.

2. In a weighing mechanism, the combination with a casing, opposing beams fulcrumed therein, a tray carrying bar suspended from the ends of said beams on the outer sides of their fulcrum points, and pivoted pendulums having normally elevated weights the heads of said pendulums being connected with the inner portions of said beams, of an equalizing bar having its end portions connected with said beams, and a chart operating bar connected centrally with said equalizing bar.

In testimony whereof I affix my signature in presence of two witnesses.

JOHN STURGUS BRADLEY.

Witnesses:
 L. CARL STOUGHTON,
 C. C. SHEPHERD.